US012777001B2

(12) United States Patent
Biradar et al.

(10) Patent No.: US 12,777,001 B2
(45) Date of Patent: Oct. 27, 2026

(54) GENERATING A UNIQUE ID FOR A FLOW AND AUTO AGING

(71) Applicant: Advanced Micro Devices, Inc., Santa Clara, CA (US)

(72) Inventors: Rajshekhar Biradar, Bangalore (IN); Akshaya Nadahalli, Bengaluru (IN); Vijay Sampath, Milpitas, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 234 days.

(21) Appl. No.: 18/608,306

(22) Filed: Mar. 18, 2024

(65) Prior Publication Data

US 2025/0293995 A1 Sep. 18, 2025

(51) Int. Cl.
*H04L 49/00* (2022.01)

(52) U.S. Cl.
CPC ...... *H04L 49/3063* (2013.01); *H04L 49/3009* (2013.01)

(58) Field of Classification Search
CPC .................................................. H04L 49/3063
See application file for complete search history.

(56) References Cited

U.S. PATENT DOCUMENTS

2020/0314011 A1* 10/2020 Deval ..................... H04L 45/38
2021/0243091 A1* 8/2021 Raney ................... H04L 9/0819

* cited by examiner

*Primary Examiner* — Esther B. Henderson
(74) *Attorney, Agent, or Firm* — Patterson + Sheridan, LLP

(57) ABSTRACT

Embodiments herein describe a NIC that generates unique IDs for data flows using data fields within packets. The flow table can include multiple sub-entries that can map to the same IP ID. Each sub-entry in the flow table can be assigned a different key that serves as a unique ID for the flow for matching to packets that belong to the same network flow.

20 Claims, 5 Drawing Sheets

GENERATING A UNIQUE ID FOR A FLOW AND AUTO AGING

TECHNICAL FIELD

Examples of the present disclosure generally relate to generating a unique ID for identifying network flows in flow tables in a network interface card/controller (NIC).

BACKGROUND

IP fragmentation is a process used in the Internet Protocol (IP) to transmit data packets that are larger than the maximum transmission unit (MTU) supported by a network. When a packet is too large to be transmitted across a network in a single piece, IP fragmentation divides the packet into smaller fragments that can be transmitted and reassembled at the destination.

One benefit of IP fragmentation includes allowing communication between networks with different MTU sizes. Networks may have diverse infrastructures, and some networks might have smaller MTU sizes due to various constraints. By fragmenting packets, data can still be transmitted across these networks without requiring network-wide MTU adjustments.

Another benefit of IP fragmentation includes data transfer flexibility enabling the transmission of large packets, such as file transfers or multimedia streams, without the need for packet segmentation on the application layer. This allows applications to send larger chunks of data in a single IP packet, simplifying the data transfer process and potentially reducing the overhead of handling multiple smaller packets.

However, reassembling packet flows can be a time consuming process at the destination. It typically requires using software executing on a host central processing unit (CPU) or on a processing core in the NIC.

SUMMARY

One embodiment described herein is a network interface controller or card (NIC) that includes memory storing a flow table and a pipeline comprising circuitry configured to retrieve an identification (ID) from a packet received at the NIC, identify a plurality of sub-entries in the flow table using the ID, generate a key using multiple data fields in the packet, and iterate through the plurality of sub-entries to determine whether one of the plurality of sub-entries comprises a unique ID matching the unique ID. Moreover, a match indicates that the packet is part of a network flow assigned to one of the plurality of sub-entries.

One embodiment described herein is an integrated circuit (IC) that includes a flow table and a pipeline including circuitry configured to retrieve an identification (ID) from a packet received at the IC, identifying a plurality of sub-entries in the flow table using the ID, generate a key using multiple data fields in the packet, and iterate through the plurality of sub-entries to determine whether one of the plurality of sub-entries comprises a unique ID matching the unique ID. Moreover, a match indicates that the packet is part of a network flow assigned to one of the plurality of sub-entries.

One embodiment described herein is a method that includes retrieving an identification (ID) from a packet received at a network interface controller or card (NIC), identifying a plurality of sub-entries in a flow table in the NIC using the ID, generating a key using multiple data fields in the packet, and iterating through the plurality of sub-entries to determine whether one of the plurality of sub-entries comprises a unique ID matching the unique ID. Moreover, a match indicates that the packet is part of a network flow assigned to one of the plurality of sub-entries.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
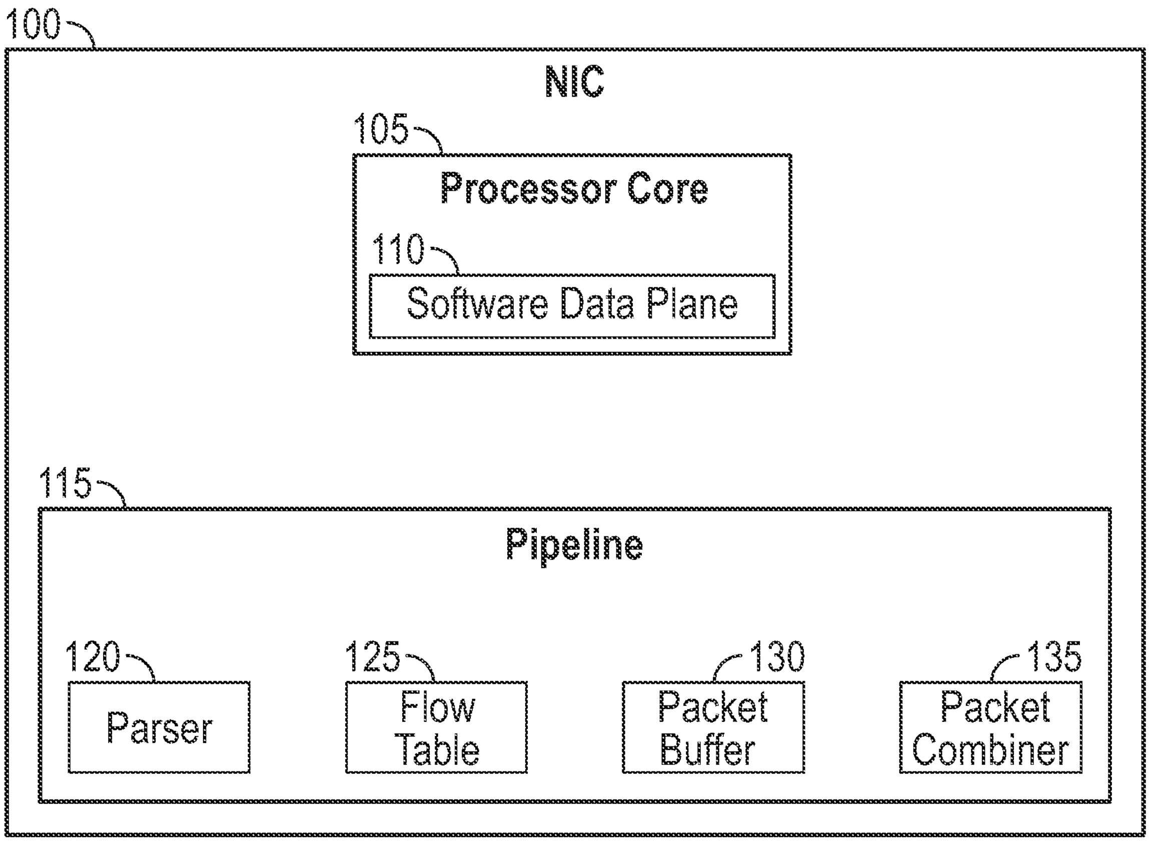
FIG. 1 illustrates a block diagram of a network interface controller or card (NIC) that generates unique IDs for network flows, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the embodiments herein or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a NIC that generates unique IDs for data flows without relying on software. For example, a NIC may include an embedded processor core (e.g., an ARM core) that executes a software data plane. However, relying on the software executing in the processor core to generate the unique ID can slow down packet processing. Instead, the embodiments herein describe using a hardware pipeline to generate unique IDs for different network flows without having to rely on software.

In one embodiment, the NIC uses data from within the packet, such as an internet protocol (IP) ID in a packet header to index into a flow table (also referred to as a forwarding table or index table). The flow table can include multiple sub-entries that can map to the same IP ID. Each sub-entry in the flow table can be assigned a different key that serves as a unique ID for a corresponding flow. Moreover, timestamps can be used to perform auto-aging (again without having to rely on software). The embodiments herein can be used to identify network flows associated with packet rewrites, connection tracking, packet reassembly, and the like.

FIG. 1 illustrates a block diagram of a NIC 100 that generates unique IDs for network flows, according to an example. The NIC 100 includes any number of processor cores 105 (e.g., ARM or x86 cores) that execute a software data plane 110. Although not shown, the processor cores 105 can also execute software for a management plane, control plane, and configuration plane.

Packet reassembly can be one task performed, in part, within the software data plane 110. However, performing packet reassembly in the processor core 105 is an expensive operation. Packet reassembly is the opposite of IP fragmentation, which is a process used to transmit data packets that are larger than the maximum transmission unit (MTU) supported by a network. When a packet is too large to be transmitted across a network in a single piece, IP fragmentation divides the packet into smaller fragments that can be transmitted and reassembled at the destination.

When packet reassembly is offloaded to the NIC, the first packet in the flow is sent to the processor core 105 for flow tuple extraction and programming. This incurs a performance penalty which is significant for short lived flows (where there is only a handful of packets, as is the case with IP fragmentation). However, punting the packets to the processor core 105 (or to a host CPU) can be avoided if flows and their associated data can be auto programmed by flow tables using a unique ID. Packet reassembly uses a unique ID associated with all the fragments of the same packet so that the fragments can be reassembled in hardware. The embodiments herein provide an efficient and scalable unique ID generator and auto aging mechanisms in a pipeline 115 which can be used for packet reassembly as well as other applications such as packet rewrites and connection tracking.

The pipeline 115 includes a parser 120, one or more flow tables 125, packet buffer 130, and packet combiner 135, which can be implemented using circuitry. In one embodiment, the parser 120, the flow tables 125, the packet buffer 130, and the packet combiner 135 may be part of (or compatible with) the P4 Portable NIC Architecture (PNA). P4 is a domain-specific language for describing how packets are processed by a network data plane. A P4 program comprises an architecture, which describes the structure and capabilities of the pipeline, and a user program, which specifies the functionality of the programmable blocks within that pipeline.

The parser 120 evaluates packets received at the NIC 100 to identify data of interest in, e.g., the headers of the packet. In the embodiments herein, the parser 120 can identify an IP ID for the packet.

The IP ID can be used to index or hash into the flow table 125 (which is stored in memory in the NIC 100). The flow table 125 can store entries for different network flows, such as packet reassembly flows, packet rewrites, and connection tracking. In the case of packet reassembly, if there is a hit or match, the matched packet can be stored in the packet buffer 130 and then recombined by the packet combiner 135 once all the packet fragments are received. However, if there is a miss, rather than sending the packet to the software data place 110 executing on the embedded processor core 105 in the NIC 100 (or to a host CPU), the embodiments herein can claim or generate a new entry in the flow table 125 and a unique ID for the packets that are part of that flow. This will be discussed in more detail in the figures that follow.

In one embodiment, the NIC 100 is implemented on an integrated circuit (IC) (e.g., an application specific integrated circuit (ASIC)), on multiple ICs, or a P4 based data processing unit.

Figure 2:
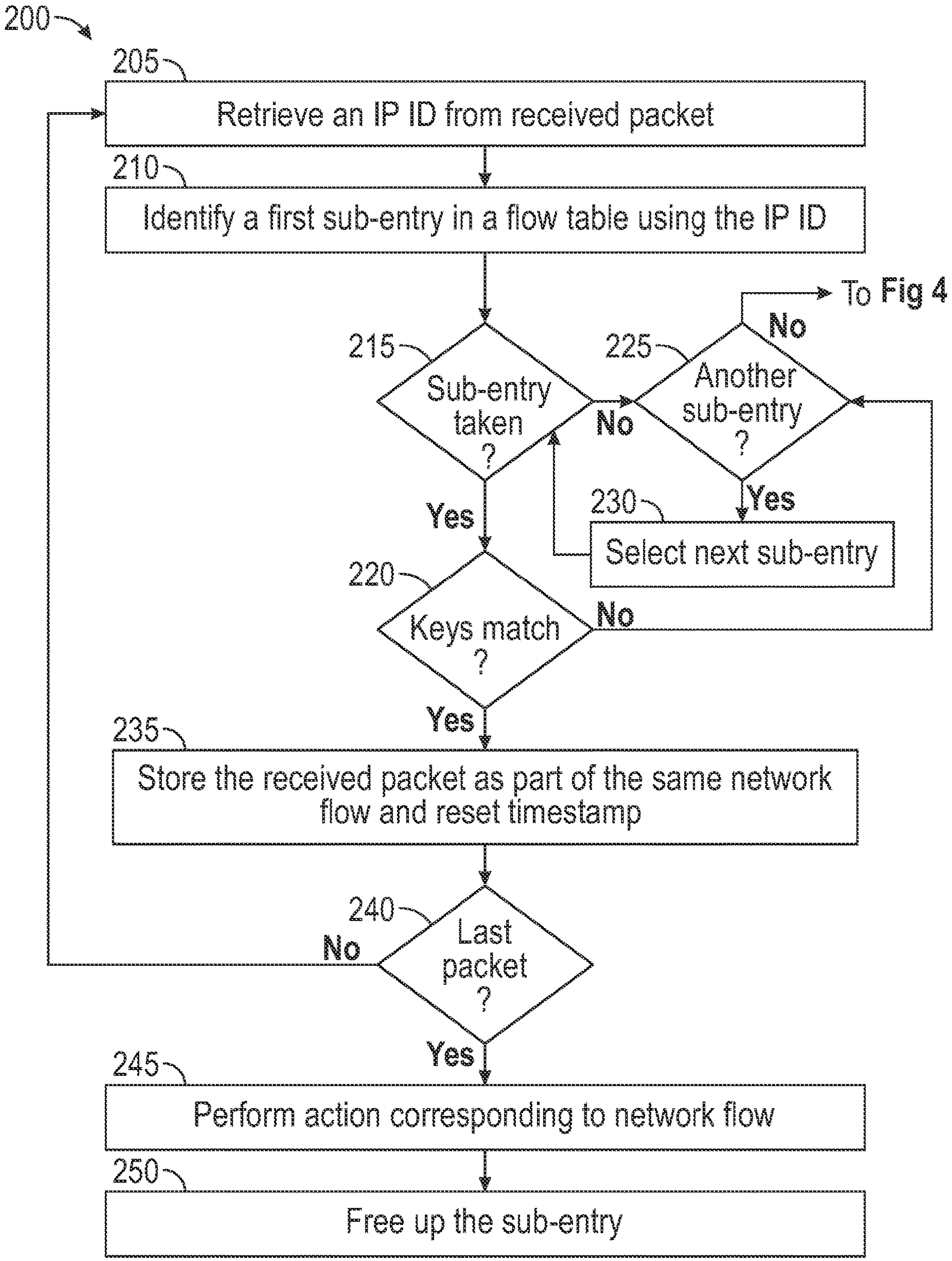
FIG. 2 is a flowchart for managing network flows, according to an example.

FIG. 2 is a flowchart of a method 200 for managing network flows, according to an example. At block 205, a pipeline in a NIC (or more specifically, the parser 120 in FIG. 1) retrieves an IP ID from a received packet. The IP ID is the same for all fragments of an IP packet that has been fragmented (in order to satisfy a network's MTU), but should not be used as a unique ID for the network flow since packets from different hosts can have the same IP ID. Nonetheless, the embodiments herein still use the IP ID as a portion of the unique ID that is generated later.

Figure 3:
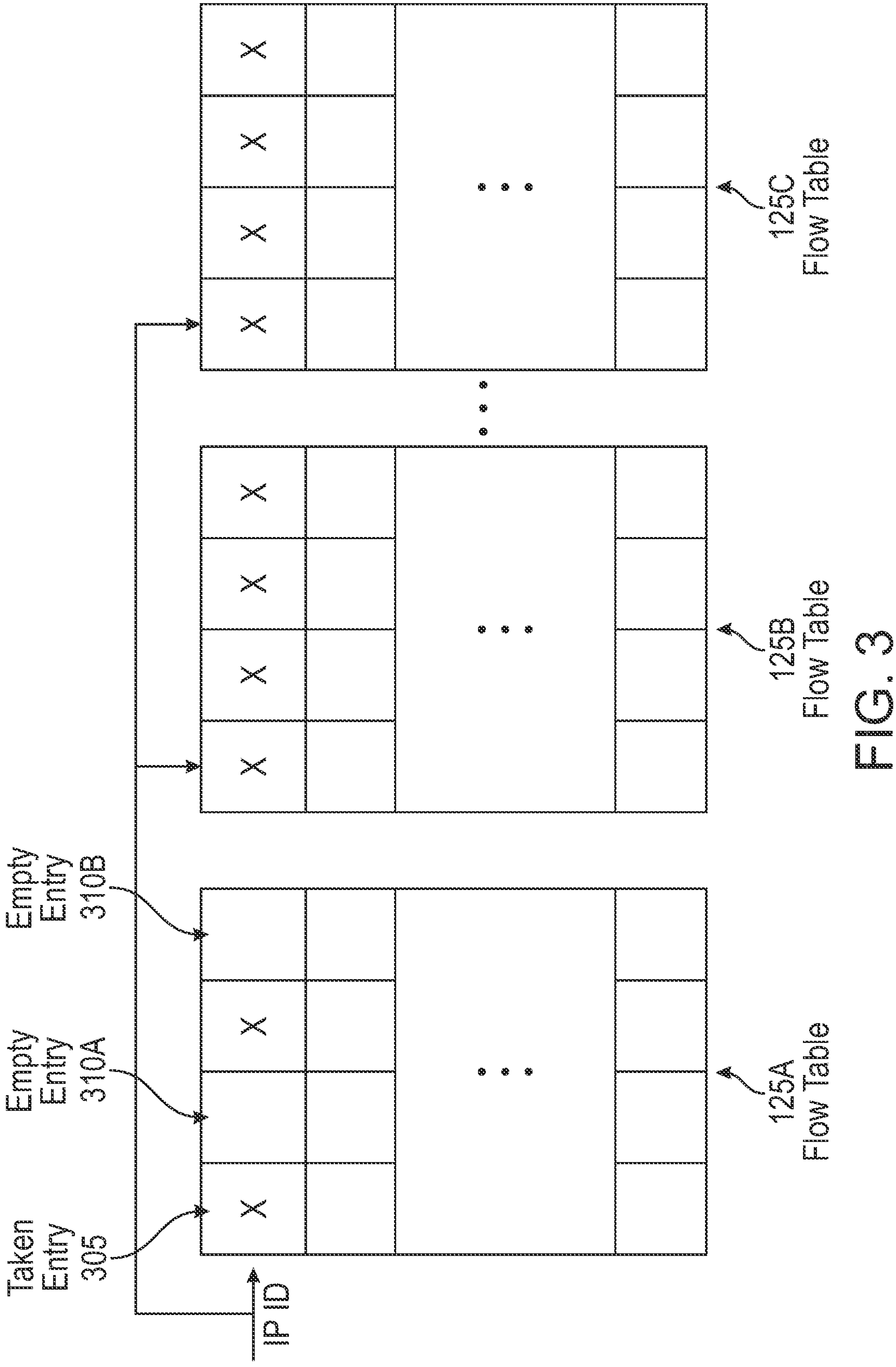
FIG. 3 illustrates flow tables in a pipeline of a NIC, according to an example.

At block 210, the pipeline identifies a first sub-entry in a flow table (e.g., the flow table 125 in FIG. 1) using the IP ID. For example, multiple entries in the flow table may hash or index to the same IP ID. These entries are called "sub-entries." While the method 200 discusses one flow table, the pipeline may include multiple flow tables, which is illustrated in FIG. 3. FIG. 3 illustrates flow tables 125A-C in a pipeline of a NIC, according to an example. As shown, an IP ID (which may be retrieved by the parser) can be used to index or hash into each of the flow tables 125. This can occur in parallel.

The same IP ID indexes into the same row in each of the flow tables 125. In this example, the rows of the flow tables 125 are subdivided into four sub-entries. For the flow table 125A, it has two sub-entries that are taken entries 305 as indicated by the X. The four sub-entries in the flow tables 125B and 125C have also already been claimed for different network flows. However, the row in flow table 125A has two empty sub-entries: empty sub-entry 310A and empty sub-entry 310B. The sub-entries can store a value that indicates if the sub-entry has already been claimed (e.g., a 1) or is free (e.g., a 0).

As described in more detail below, the pipeline can use the IP ID to index into the corresponding row in each of the flow tables 125 in parallel. The pipeline can then evaluate each of the sub-entries in the row in parallel to find whether the current packet belongs to a flow that already has claimed a sub-entry in one of the flow tables 125, or is the first packet of the flow, and thus, should be allocated one of the empty sub-entries 310.

While FIG. 3 illustrates three flow tables 125, the pipeline may include any number of flow tables 125 which may be a tradeoff between the number of entries desired to service the flows and the amount of memory available in the NIC.

Returning to FIG. 2, at block 215 the pipeline determines whether the sub-entry is taken. For example, the pipeline can evaluate an entry_valid bit to determine whether the current sub-entry being evaluated has been claimed by a network flow. If not, the method 200 proceeds to block 225 where the pipeline determines if there is another sub-entry—e.g., whether the pipeline has reached the last sub-entry for the row that is identified by the IP ID. Assuming the pipeline has not evaluated each sub-entry in the row, the method proceeds to block 230 where the pipeline selects the next sub-entry and returns to block 215 to determine whether that sub-entry is taken.

Assuming the sub-entry is taken, the method 200 proceeds to block 220 to determine whether the current packet has a key that matches a unique ID for that entry. In one embodiment, the key (or the unique ID) is shared by each packet that is part of the same flow. Thus, the ID is unique in that no other flow will have the same ID, but it is not unique in that each packet within that flow will have the same ID or key. That way, packets for a particular flow can be uniquely identified from packets that do not belong to that network flow.

In one embodiment, the key (or the unique ID) is the combination of the IP ID, the IP source, the IP destination, and IP proto fields. These are data fields within headers of IP packets. The process of combining these data fields to result in a unique ID can be referred to as unique ID generation. While the embodiments herein describe using a combination of the IP ID, the source, the destination, and the IP proto fields, other combinations of fields in the packet header may be used to result in the unique ID. However, because simply combining the IP ID, the IP source, the IP destination, and IP proto fields can result in a very large value, for the unique ID to be used as a memory pointer, it should be smaller than the total memory size. Thus, in one embodiment, the unique ID can be the UP ID<<(total collision bits)+collision id which is less number of bits compared to total key size. Note that here collision ID is the same as the sub entry ID.

At block 220, the pipeline can generate a key for the current packet based the data retrieved by the parser. For example, the parser may retrieve the IP ID, the IP source, the IP destination, and IP proto fields to generate the key. This key can then be compared to a unique ID already stored in the sub-entry being evaluated. If the keys matches the unique ID, this indicates the current packet is part of a flow that has already been allocated the sub-entry within the flow table. If not, the method 200 can proceed to block 225 to select the next sub-entry to determine whether it is a match.

Assuming the current packet has a key that matches the unique ID already stored in the flow table, the method 200 proceeds to block 235 where the pipeline stores the received packet as part of the same network flow. For example, the pipeline may temporally store the packet into the packet buffer 130 in FIG. 1.

In addition to storing the packet, the pipeline may reset a timestamp in the match sub-entry. For example, each taken sub-entry in the flow table may have a timestamp indicating the last time a packet for the flow was identified by the pipeline. Each time a new packet is identified that has the same key or unique ID as the network flow, the timestamp is reset. This timestamp can then be used to perform auto-aging to identify network flows where packets may have been lost. In that case, the sub-entry may be allocated to another network flow, and the packets stored for that network flow may be removed from the packet buffer. This is discussed in more detail in FIG. 4.

At block 240, the pipeline determines whether the current packet is the last packet for the network flow. Using the example of packet reassembly, at block 240 the pipeline determines if it has received the packets that include all the fragments for a packet at the transmitter that went through IP fragmentation. If the last packet has not been received, the method returns to block 205 where the pipeline evaluates the next packet.

However, if the last packet has been received, at block 245 the pipeline performs the action corresponding to the network flow such as packet reassembly or packet rewrite. Once complete, at block 250 the pipeline can free up the sub-entry for that network flow so it can be used by a different network flow. For example, the entry_valid value for the sub-entry can be reset so that sub-entry can be overwritten when the first packet for a new network flow is received.

Assuming the action performed at block 245 is packet reassembly, the following discussion describes different embodiments and techniques for determining when the last packet (or fragment) was received. In one embodiment, the pipeline can identify ingress packets that contain IP fragments that should be reassembled using IP flags. To perform reassembly, the pipeline can use the unique ID to identify the fragments belonging to the same (larger) packet. In one embodiment, the pipeline can use direct memory access (DMA) to a designated memory buffer at an offset specified in the IP header.

Due to out of order packet delivery at the NIC, the embodiments herein can verify when all the fragments have been received. For example, special write back tables in the pipeline (using the unique ID as the key) can be used to track and notify once all the fragments have been received. To track out of order packeting containing IP fragments, in one embodiment the pipeline maintains a bit map, fragment offset, last fragment bit, payload MTU, and total fragments fields in a d-vector (e.g., action data) in the sub-entry of the flow table. Assuming the total number of fragments cannot exceed a value of N, then the bitmap should include N number of bits.

The action data payload MTU field is set when any fragment except the last fragment is received. The fragment offset of the last fragment and the last fragment bit are set when the last fragment is received. The total fragments field is calculated once both the MTU and the frag offset details are updated. For example, the total fragments can equal the fragment offset divided by the MTU. This excludes the last fragment.

For every packet received (except for the last fragment), the fragment bitmap (fb) is updated using fb=fb|1<<(packet frag_offset/MTU). When the bitmap fb==(0×FFFF>>(N-total fragments) and the last fragment bit is also set, this is an indication that all fragments have been received and the pipeline can start the reassembly operation. Using the bitmap also helps the pipeline to identify duplicate fragments received from the network which can be dropped or logged.

The action data fields described above are further defined in the following table.

TABLE 1

| Action Data Fields | Description |
|---|---|
| Payload MTU (m) | The is the payload size of the IP fragment (except last fragment) |
| Last Fragment offset (lfo) | This the fragment offset field present in the last fragment IP header |
| Total fragments | Total fragments = (lfo/m) + 1 |
| Last fragment bit | This bit is set when last fragment is received (i.e., no MF flag in IP header) |
| Fragments bitmap (fb) | For every fragment (except last)(fb) = fb \| 1 << (packet frag_offset/m) |

Figure 4:
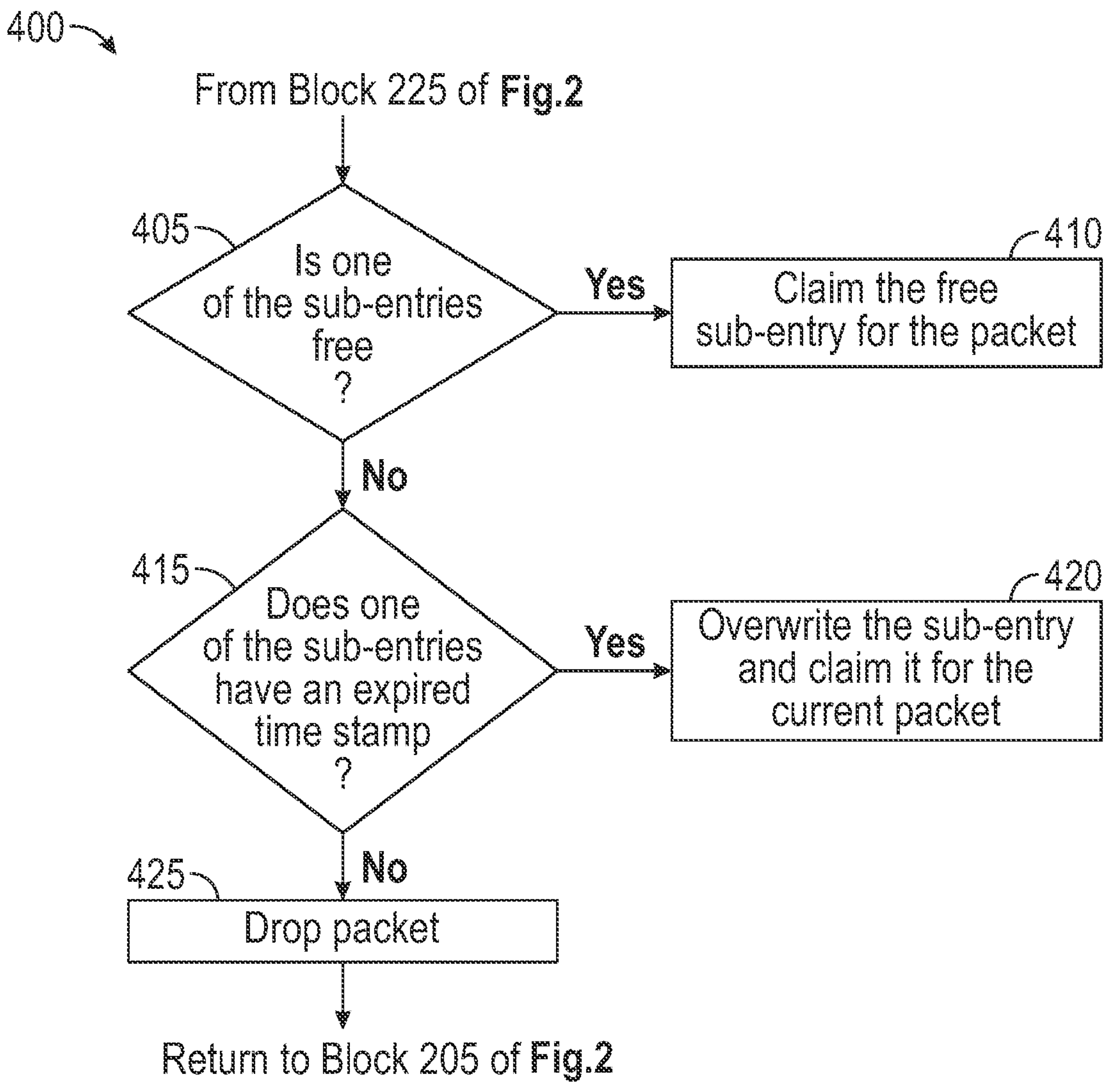
FIG. 4 is a flowchart for generating new entries in a flow table, according to an example.

FIG. 4 is a flowchart of a method 400 for generating new entries in a flow table, according to an example. In one embodiment, the method 400 begins after block 225 where the pipeline has reached the end of the sub-entries in a row of a flow table without identifying a sub-entry that has a unique ID that matches the key of the current packet. This means that a sub-entry in the flow table (or flow tables) has not previously been allocated to the network flow containing the packet. In other words, the current packet is the first packet received at the NIC for the network flow.

At block 405, the pipeline determines whether one of the sub-entries is free. For example, when iterating through the flow table, the pipeline may track whether it identified a free sub-entry at block 215, or the pipeline may re-iterate through the sub-entries to identify a free sub-entry. If multiple flow tables are used, the pipeline may identify multiple sub-entries in different flow tables that are free. The pipeline can use rule based logic to select which free sub-entry to use from which table. In any case, it may not matter which free sub-entry is selected.

If there is at least one free sub-entry, the method 400 proceeds to block 410 where the pipeline claims the free sub-entry for the current packet. As part of claiming the sub-entry, the pipeline changes the entry_valid value for the entry to indicate the entry is now taken. Also, the pipeline can perform the unique ID generation process to store the unique ID for the flow. In one embodiment, the unique ID is the combination of the IP ID, the IP source, the IP destination, and IP proto fields. These are data fields within headers of the current packet. As discussed above, other packets in the same flow will have the same data fields in the headers, and thus, the parser can generate a key for those packets that will match the unique ID stored in the sub-entry.

If the IP ID is used as the unique ID, it could be prone to collisions when the system receives packets from different hosts. Hence, in one embodiment, the system saves the entire flow tuple details (IP SRC/DST, proto, src/dst port) in action data (d-vector). When an entry is hit by a new packet, it means apart from matching IP ID, all the flow tuples stored in action data are matching with the contents from the packet header. Once we find that the entry is hit, the system can derive the unique ID as IP ID<<(total collision bits)+collision id. For example, if IP ID is 125 and each flow row has 4 sub entries then the unique IDs will be 1251, 1252, 1253, 1254. This unique can be used as a base pointer in the packet buffer memory where the fragments are stored till all the fragments are used. For instance, if system receives fragment 3, it can store it in the unique ID+3 (offset) memory location.

Returning to block 405, if there are no free sub-entries in the flow table, the method 400 proceeds to block 415 where the pipeline determines whether one of the sub-entries has an expired timestamp. As mentioned in the method 200, the pipeline can maintain a timestamp for each taken sub-entry that is reset to a current timestamp each time the pipeline identifies a new packet that belongs to the flow or sub-entry. This prevents packets with missing fragments from taking sub-entries in the flow table that last forever. Thus, when claiming a free sub-entry at block 410, the pipeline can populate a timestamp field in the sub-entry with a current timestamp and then update it each time a new packet belonging to the corresponding flow is identified.

If the timestamp for a taken sub-entry in the row has expired (e.g., exceeds a threshold when compared to a current system time), the method 400 proceeds to block 420 where the pipeline overwrites the sub-entry and claims it for the current packet. That is, the method 400 can perform the same steps discussed in block 410 to generate the fields in the entry that claim the entry for the current packet.

However, if there are no free sub-entries and the timestamps for the sub-entries in the row are current, then at block 425 the pipeline drops the packet. The network device that sent the packet may resend the packet at a later time, in which case the NIC can perform methods 200 and 400 again, and this time, there may be an available sub-entry for the packet.

In another embodiment, the NIC may buffer the packet and periodically re-evaluate the availability of the flow table(s) to determine if there is a sub-entry in the corresponding row that can be claimed by the packet.

While FIG. 4 illustrates first checking and claiming free sub-entries for new flows, the order may be reserved where the pipeline first checks whether there are sub-entries with expired timestamps to use for new flows, and if not, then checks whether there are free sub-entries.

Figure 5:
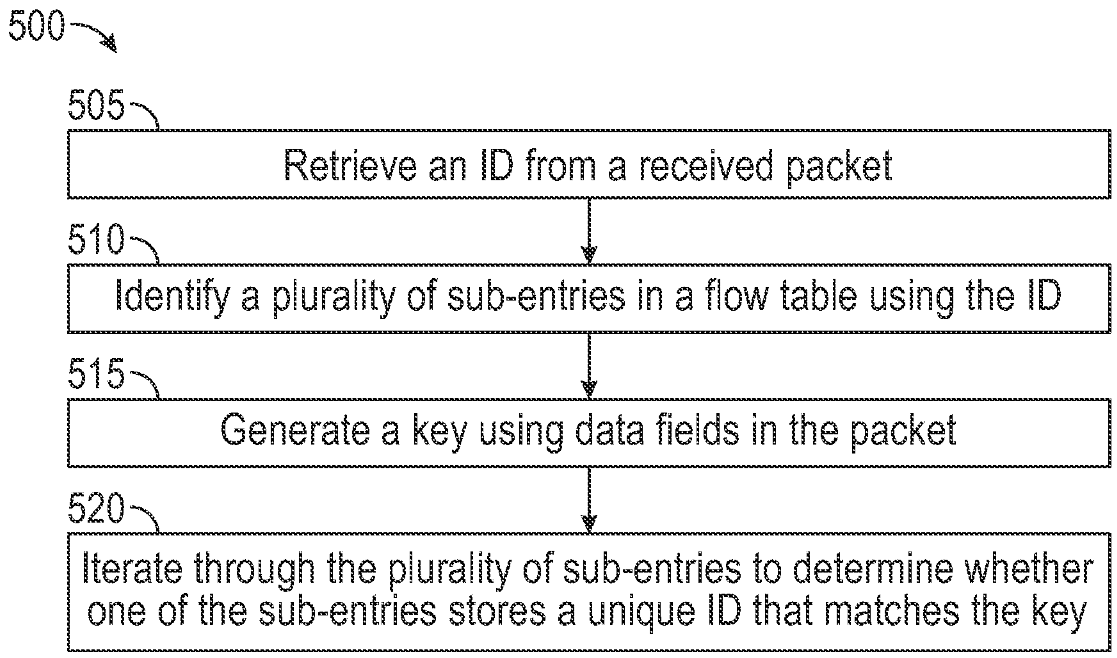
FIG. 5 is a flowchart for identifying packets that belong to a network flow, according to an example.

FIG. 5 is a flowchart of a method 500 for identifying packets that belong to a network flow, according to an example. At block 505, a NIC retrieves an ID from a received packet. In one embodiment, the ID is an IP ID that is in the header of the packet, such as the IP identification field. The IP ID, however, may not be a unique ID since packets from different hosts can have the same IP identification field. Nonetheless, the IP ID can be used as a hash value or indexing value in order to search a flow table in the NIC.

At block 510, the NIC identifies a plurality of sub-entries in the flow table using the ID. For example, the ID may index to a particular row (or multiple rows) in the flow table that contains a plurality of sub-entries. In one embodiment, different IP IDs map to different pluralities of sub-entries in the flow table. For example, a different value of the IP identification field may map to a different row, and thus, a different plurality of sub-entries. Thus, different IP ID values can map to different, non-overlapping pluralities of sub-entries in the flow table.

At block 515, the NIC generates a key using data fields in the packet. In one embodiment, this key is unique to a network flow, but is shared by all packets within that network flow. In one embodiment, the key can be a combination of the IP identification field, the IP source address, the IP destination address, and IP proto fields. These fields can be found in different data fields in the header of the packet. This is just one example of a suitable key (or combination of data fields) that can be used to identify packets in different network flows.

At block 520, the NIC iterates through the plurality of sub-entries identified at block 510 to determine whether one of the sub-entries stores a unique ID that matches the key. As discussed above, when the first packet in a network flow arrives, the NIC can identify a free sub-entry (or a sub-entry where the timestamp has expired) and assign it to the network flow of that packet. As part of this assignment, the key generated by the first packet becomes the unique ID that is stored in the assigned sub-entry. That way, when later packets arrive that are also part of the flow, the NIC can generate a key from those packets that will match the unique ID in the assigned sub-entry.

In one embodiment, when matching the packet to one of the sub-entries, the NIC can update a timestamp stored in the sub-entry. This helps the sub-entry from being replaced by another network flow if the timestamp expires or becomes stale.

If there is no match among the plurality of sub-entries, then the method 500 can include the method 400 where the NIC searches for a free sub-entry or a sub-entry with an expired timestamp within the plurality of sub-entries. If one is identified, that sub-entry can be assigned to the network for that packet In addition, although not shown in the method 500, when matching a packet to one of the plurality of sub-entries, the NIC may check whether the packet is the last packet of the network flow. If so, the NIC may perform an action on the packets that were received as part of the network flow, such as packet reassembly, performing a rewrite, connection tracking, and the like. This was discussed at blocks 240-250 in FIG. 2.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. A network interface controller or card (NIC), comprising:

memory storing a flow table; and a pipeline comprising circuitry configured to:

retrieve an identification (ID) from a packet received at the NIC, identify a plurality of sub-entries in the flow table using the ID, generate a key using multiple data fields in the packet, wherein the ID is different than the key; and iterate through the plurality of sub-entries to determine whether one of the plurality of sub-entries comprises a unique ID matching the key, wherein a match indicates that the packet is part of a network flow assigned to one of the plurality of sub-entries.

2. The NIC of claim 1, wherein the pipeline is further configured to:

upon determining there is no match with the plurality of sub-entries, identify a free sub-entry in the plurality of sub-entries;

claim the free sub-entry for a network flow containing the packet; and store the key for the packet as the unique ID for the network flow containing the packet.

3. The NIC of claim 1, wherein the pipeline is further configured to:

upon determining there is no match with the plurality of sub-entries, identify a first sub-entry in the plurality of sub-entries with an expired timestamp;

claim the first sub-entry for a network flow containing the packet; and store the key for the packet as the unique ID for the network flow containing the packet.

4. The NIC of claim 1, wherein the pipeline is further configured to:

upon determining there is a match with one of the plurality of sub-entries, store the packet as part of the network flow assigned to the one of the plurality of sub-entries.

5. The NIC of claim 4, wherein the pipeline is further configured to:

reset a timestamp stored in the one of the plurality of sub-entries.

6. The NIC of claim 1, wherein different IDs in packets received at the NIC map to different, non-overlapping pluralities of sub-entries in the flow table.

7. The NIC of claim 6, wherein the different, non-overlapping pluralities of sub-entries correspond to different rows in the flow table.

8. The NIC of claim 1, further comprising:

a plurality of flow tables, wherein the ID is used to identify a plurality of sub-entries in each of the plurality of flow tables in parallel.

9. An integrated circuit (IC), comprising:

a flow table; and a pipeline comprising circuitry configured to:

retrieve an identification (ID) from a packet received at the IC;

identify a plurality of sub-entries in the flow table using the ID;

generate a key using multiple data fields in the packet, wherein the ID is different than the key; and iterate through the plurality of sub-entries to determine whether one of the plurality of sub-entries comprises a unique ID matching the key, wherein a match indicates that the packet is part of a network flow assigned to one of the plurality of sub-entries.

10. The IC of claim 9, wherein the pipeline is further configured to:

upon determining there is no match with the plurality of sub-entries, identify a free sub-entry in the plurality of sub-entries;

claim the free sub-entry for a network flow containing the packet; and store the key for the packet as the unique ID for the network flow containing the packet.

11. The IC of claim 9, wherein the pipeline is further configured to:

upon determining there is no match with the plurality of sub-entries, identify a first sub-entry in the plurality of sub-entries with an expired timestamp;

claim the first sub-entry for a network flow containing the packet; and store the key for the packet as the unique ID for the network flow containing the packet.

12. The IC of claim 9, wherein the pipeline is further configured to:

upon determining there is a match with one of the plurality of sub-entries, store the packet as part of the network flow assigned to the one of the plurality of sub-entries; and reset a timestamp stored in the one of the plurality of sub-entries.

13. The IC of claim 9, wherein different IDs in packets received at the IC map to different, non-overlapping pluralities of sub-entries in the flow table, wherein the different, non-overlapping pluralities of sub-entries correspond to different rows in the flow table.

14. The IC of claim 9, further comprising:

a plurality of flow tables, wherein the ID is used to identify a plurality of sub-entries in each of the plurality of flow tables in parallel.

15. A method, comprising:

retrieving an identification (ID) from a packet received at a network interface controller or card (NIC);

identifying a plurality of sub-entries in a flow table in the NIC using the ID;

generating a key using multiple data fields in the packet, wherein the ID is different than the key; and iterating through the plurality of sub-entries to determine whether one of the plurality of sub-entries comprises a unique ID matching the key, wherein a match indicates that the packet is part of a network flow assigned to one of the plurality of sub-entries.

16. The method of claim 15, further comprising:

upon determining there is no match with the plurality of sub-entries, identifying a free sub-entry in the plurality of sub-entries;

claiming the free sub-entry for a network flow containing the packet; and storing the key for the packet as the unique ID for the network flow containing the packet.

17. The method of claim 15, further comprising:

upon determining there is no match with the plurality of sub-entries, identifying a first sub-entry in the plurality of sub-entries with an expired timestamp;

claiming the first sub-entry for a network flow containing the packet; and storing the key for the packet as the unique ID for the network flow containing the packet.

18. The method of claim 15, further comprising:

upon determining there is a match with one of the plurality of sub-entries, storing the packet as part of the network flow assigned to the one of the plurality of sub-entries; and resetting a timestamp stored in the one of the plurality of sub-entries.

19. The method of claim 18, wherein different IDs in packets received at the NIC map to different, non-overlapping pluralities of sub-entries in the flow table, wherein the different, non-overlapping pluralities of sub-entries correspond to different rows in the flow table.

20. The method of claim 15, further comprising:

identifying a plurality of sub-entries in each of a plurality of flow tables in parallel using the ID.

* * * * *